(12) United States Patent
Andersson et al.

(10) Patent No.: US 11,852,056 B2
(45) Date of Patent: Dec. 26, 2023

(54) METHOD FOR CONTROLLING LUBRICATION OF A CONNECTING ROD BEARING

(71) Applicant: VOLVO TRUCK CORPORATION, Gothenburg (SE)

(72) Inventors: Arne Andersson, Mölnlycke (SE); Bengt Lassesson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 188 days.

(21) Appl. No.: 16/963,688

(22) PCT Filed: Feb. 5, 2018

(86) PCT No.: PCT/EP2018/052793
§ 371 (c)(1),
(2) Date: Jul. 21, 2020

(87) PCT Pub. No.: WO2019/149381
PCT Pub. Date: Aug. 8, 2019

(65) Prior Publication Data
US 2021/0079818 A1 Mar. 18, 2021

(51) Int. Cl.
*F01M 1/08* (2006.01)
*F01L 9/16* (2021.01)
(Continued)

(52) U.S. Cl.
CPC ............... *F01M 1/08* (2013.01); *F01L 9/16* (2021.01); *F01M 11/02* (2013.01);
(Continued)

(58) Field of Classification Search
None
See application file for complete search history.

(56) References Cited

U.S. PATENT DOCUMENTS

| | | | |
|---|---|---|---|
| 2,702,219 A | 2/1955 | Sintz et al. | |
| 2,742,883 A * | 4/1956 | Smith | F02F 3/22 |
| | | | 123/41.38 |

(Continued)

FOREIGN PATENT DOCUMENTS

| | | |
|---|---|---|
| CN | 202017549 U | 10/2011 |
| CN | 103925110 A | 7/2014 |

(Continued)

OTHER PUBLICATIONS

International Search Report and Written Opinion dated Oct. 29, 2018 in corresponding International PCT Application No. PCT/EP2018/052793, 10 pages.

(Continued)

*Primary Examiner* — Wesley G Harris
(74) *Attorney, Agent, or Firm* — Venable LLP; Jeffri A. Kaminski

(57) ABSTRACT

The present invention relates to a method for controlling lubrication of a connecting rod bearing of an internal combustion engine arrangement. The method comprises the steps of controlling an inlet valve to be maintained in the closed position during a movement of the reciprocating piston from the top dead center during an intake stroke for a predetermined number of crank angle degrees; and positioning the inlet valve in the open position when the reciprocating piston has traveled the predetermined number of crank angle degrees from the top dead center, wherein lubricating medium is provided to the connecting rod bearing within a predetermined time period before the inlet valve is arranged in the open position.

14 Claims, 7 Drawing Sheets

(51) Int. Cl.
  *F01M 11/02* (2006.01)
  *F02D 13/02* (2006.01)
(52) U.S. Cl.
  CPC ..... *F02D 13/0226* (2013.01); *F02D 13/0253* (2013.01); *F02D 13/0265* (2013.01); *F02D 13/0273* (2013.01); *F01L 2800/05* (2013.01); *F01L 2800/19* (2013.01); *F01L 2810/02* (2013.01); *F01M 2001/086* (2013.01); *F01M 2011/025* (2013.01); *F01M 2011/027* (2013.01)

(56) References Cited

U.S. PATENT DOCUMENTS

| | | | |
|---|---|---|---|
| 3,380,556 A | | 4/1968 | Whitehead |
| 3,480,113 A | | 11/1969 | Pope et al. |
| 3,739,657 A | * | 6/1973 | Patchen ............... F16C 7/023 |
| | | | 74/579 E |
| 4,502,423 A | | 3/1985 | Perry |
| 5,445,123 A | * | 8/1995 | Hitomi ................ F01L 1/34 |
| | | | 123/311 |
| 6,092,496 A | * | 7/2000 | Bhargava ............ F02D 41/064 |
| | | | 123/179.21 |
| 2004/0134449 A1 | | 7/2004 | Yang |
| 2005/0039711 A1 | | 2/2005 | Bryant |
| 2006/0016421 A1 | | 1/2006 | Kuo et al. |

FOREIGN PATENT DOCUMENTS

| | | | | |
|---|---|---|---|---|
| DE | 3105702 A1 | | 8/1982 | |
| DE | 102011115973 A1 | * | 4/2013 | ............... F01M 1/06 |
| GB | 2136088 A | | 9/1984 | |

OTHER PUBLICATIONS

China Office Action dated Jul. 29, 2021 in corresponding China Patent Application No. 201880088227.2, 12 pages.

* cited by examiner

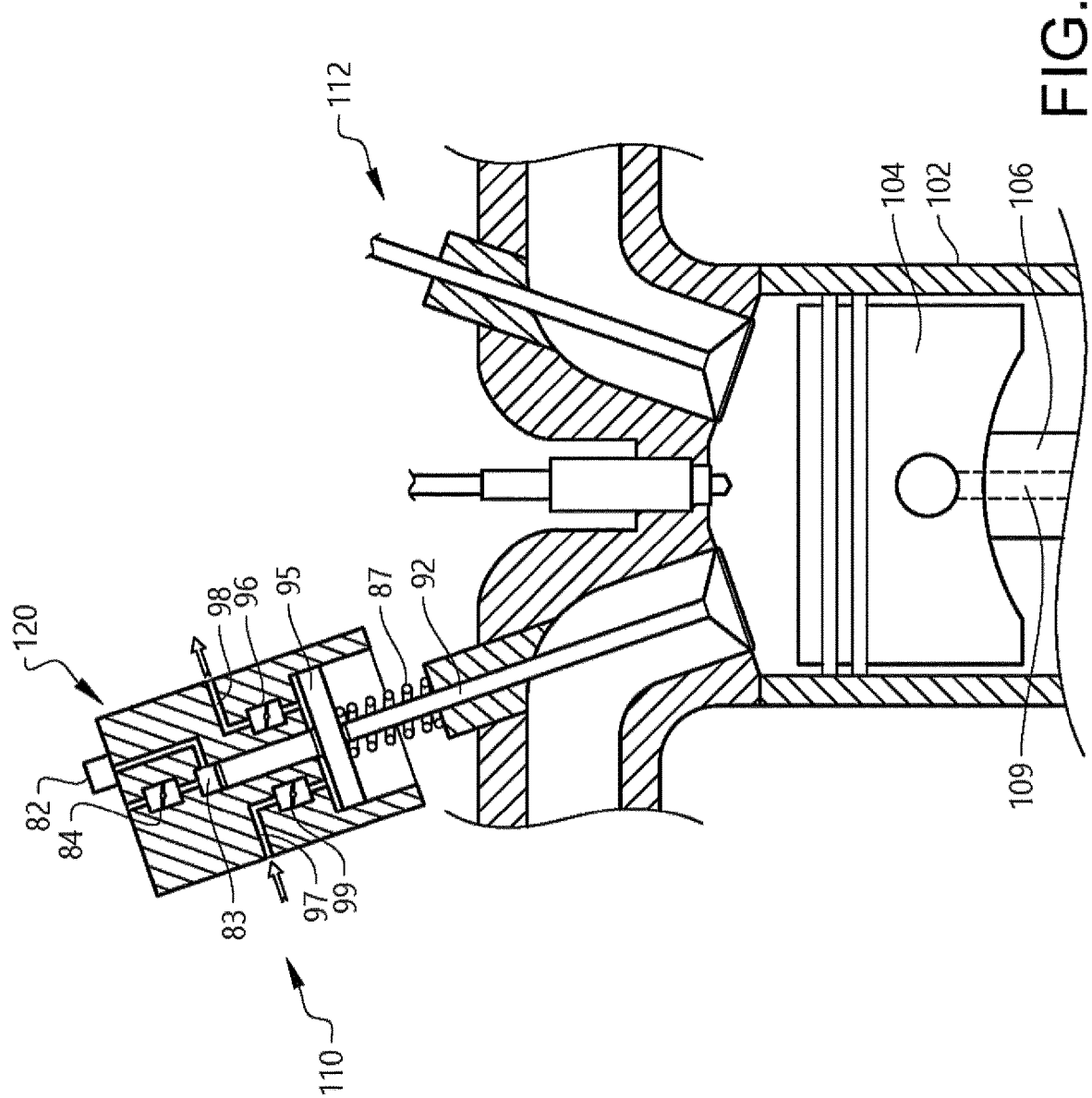

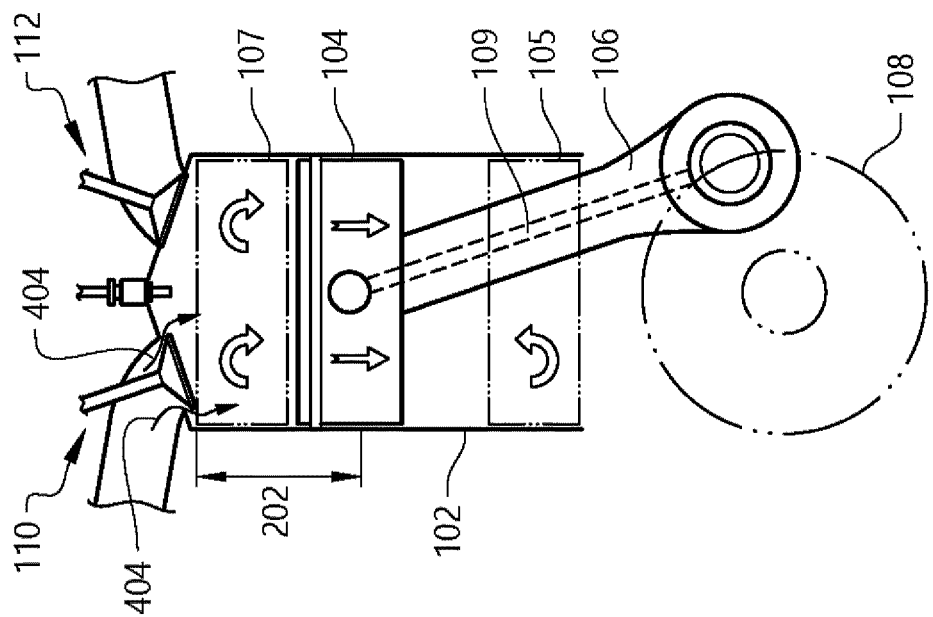
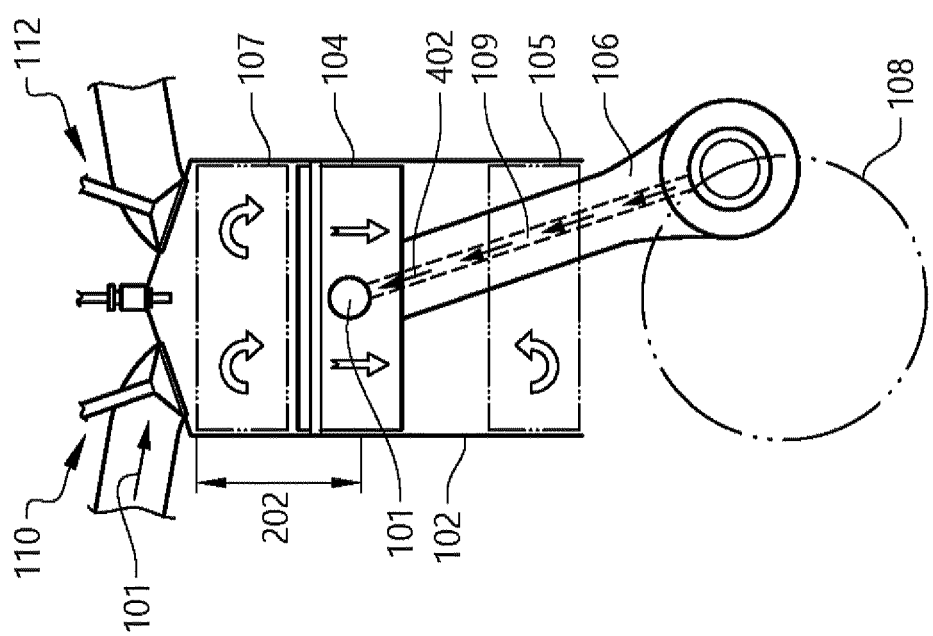
FIG. 4a
FIG. 4b

METHOD FOR CONTROLLING LUBRICATION OF A CONNECTING ROD BEARING

CROSS-REFERENCE TO RELATED APPLICATIONS

This application is a U.S. National Stage of PCT/EP2018/052793, filed Feb. 5, 2018, and published on Aug. 8, 2019, as WO 2019/149381 A1, all of which is hereby incorporated by reference in its entirety.

TECHNICAL FIELD

The present invention relates to a method for controlling lubrication of a connecting rod bearing of an internal combustion engine arrangement. The invention also relates to a corresponding internal combustion engine arrangement. The invention is applicable on vehicles, in particularly low, medium and heavy duty vehicles commonly referred to as trucks. Although the invention will mainly be described in relation to a truck, it may also be applicable for other type of vehicles.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

Conventionally, a combustion cylinder of an internal combustion engine comprises an inlet valve and an outlet valve, wherein the inlet valve is arranged in an open position at an intake phase during the downward motion of a piston in the combustion cylinder. The inlet valve is thereafter closed when the piston reaches the bottom dead center (BDC) of the cylinder, and is closed during the compression phase, the combustion phase and the exhaust phase, and opened again when the piston reaches the top dead center (TDC) for the next coming intake stroke.

The piston is in turn connected to a crank shaft via a connecting rod. The piston is furthermore connected to the connecting rod by means of a bearing for allowing a rotational movement there between. When the gas pressure in the combustion cylinder is low but the piston acceleration is high, the forces acting on the bearing changes sign, from e.g. a positive force to a negative force, or vice versa, when the piston is positioned at the TDC. Hereby, lubrication of the bearing is possible. The lubrication is provided by a constant pressure of the lubricant forcing the lubricant through a conduit in the connecting rod towards the bearing.

However, there are situations, for example during low engine rpm and/or high boost and/or back pressure, where the forces acting on the bearing will not change sign when the piston is positioned at the TDC. A problem is thus that lubrication of the bearing during these situations is not possible as the pressure of the lubricant is insufficient for being sufficiently delivered to the bearing. There is thus a desire to improve lubrication of the bearing between the connecting rod and the piston.

SUMMARY

It is an object of the present invention to provide a method for controlling lubrication of a connecting rod bearing which at least partially overcomes the above described deficiencies. This is achieved by a method according to claim 1.

According to a first aspect of the present invention, there is provided a method for controlling lubrication of a connecting rod bearing of an internal combustion engine arrangement, the internal combustion engine arrangement comprising a combustion cylinder housing a reciprocating piston movable between a bottom dead center and a top dead center within the combustion cylinder; a connecting rod connecting the reciprocating piston to a crank shaft of the internal combustion engine; a connecting rod bearing arranged between the connecting rod and the reciprocating piston for allowing a mutual rotational movement between the connecting rod and the reciprocating piston when the reciprocating piston moves between the bottom dead center and the top dead center; and an inlet valve operable between an open position and a closed position, the inlet valve being arranged in the open position during at least a part of an intake stroke of the reciprocating piston for allowing a flow of fluid medium into the combustion cylinder; and an outlet valve operable between an open position and a closed position, the outlet valve being arranged in the open position during at least a part of an exhaust stroke of the reciprocating piston for directing a flow of combustion gas out from the combustion cylinder, the method comprising the steps of controlling the inlet valve to be maintained in the closed position during a movement of the reciprocating piston from the top dead center during the intake stroke for a predetermined number of crank angle degrees; and positioning the inlet valve in the open position when the reciprocating piston has traveled the predetermined number of crank angle degrees from the top dead center, wherein lubricating medium is provided to the connecting rod bearing within a predetermined time period before the inlet valve is arranged in the open position.

The wordings "top dead center" and "bottom dead center" should be construed as respective upper and lower end positions for the reciprocating motion of the piston within the combustion cylinder. When stating that a valve is opened and closed at one of the top dead center and bottom dead center, it should be realized that some tolerances are within the scope of the specific definition. For example, when stating that the inlet valve is opened, i.e. positioned in the open position when the piston reaches the top dead center, the inlet valve must not necessarily be opened at the exact top dead center position of the piston, but can be opened slightly before the piston reached the top dead center, or slightly after the piston has left the top dead center.

The intake stroke is the stroke of the internal combustion engine when the piston moves from the top dead center (TDC) to the bottom dead center (BDC) and intake gas, preferably in the form of air, is provided into the combustion chamber. The exhaust stroke on the other hand is the stroke of the internal combustion engine when the piston moves from the BDC to the TDC and exhaust combusted exhaust gases through the outlet valve.

The wording "maintained in the closed position during a predetermined number of crank angle degrees" should be construed such that the inlet valve is kept closed a short period of time when the piston travels from the TDC towards the BDC. Hereby, intake gas is prevented from reaching the combustion chamber during this part of the intake stroke, whereby the gas pressure level in the combustion chamber is reduced. The specific number of crank angle degrees is naturally dependent on the specific engine used, but some exemplary embodiments are given below.

Furthermore, the "predetermined time period" should be construed as a period before the inlet valve is opened. Hence, lubricating medium is provided to the connecting rod bearing when the inlet valve is maintained in the closed position.

Still further, the above described step of maintaining the inlet valve in the closed position may be achieved in different manners. For example, pneumatically and/or hydraulically controlled valves may be used. Also, electrically controlled valves are also conceivable. Conventional valve operated by a cam shaft may also be used, wherein a cam phaser is used for maintaining the valve in the closed position.

The inventors of present disclosure have realized that by maintaining the inlet valve in the closed position during a short period of time during the intake stroke, the pressure level which the combustion chamber is rapidly decreasing, whereby the forces acting on the connecting rod bearing between the piston and the connecting rod is reduced. The reduction of the forces acting on the bearing will thus enable the lubricant, which is provided with a constant pressure in the conduit of the connecting rod, to be provided to the connecting rod bearing for lubrication thereof.

An advantage is thus that the connecting rod bearing between the piston and the connecting rod will be lubricated even at situations where the forces acting on the bearing are normally too high for providing such lubrication. These situations may often occur where the internal combustion engine comprises a compression cylinder upstream the combustion cylinder, whereby the gas pressure levels in the combustion cylinder are too high to sufficiently lubricate the connecting rod bearing, especially when operating the vehicle with low rpm. However, as the gas pressure level is reduced when controlling the internal combustion engine according to the above description, the balance between mass forces and gas forces in the combustion cylinder will enable lubricant to be provided to the connecting rod bearing for lubrication thereof.

According to an example embodiment, the inlet valve may comprise a flow controllable actuator, the flow controllable actuator being arranged to controllably operate the inlet valve between the open position and the closed position.

A flow controllable actuator is preferably pneumatically operated by receiving pressurized gas for opening and closing the inlet valve.

An advantage is that the inlet valve can be rapidly controlled between an open and a closed position. Also, the inlet valve may be operated independently of e.g. the rotation of a cam shaft.

According to an example embodiment, the step of opening the inlet valve may comprise the step of providing pressurized fluid to said flow controllable actuator when the reciprocating piston has traveled the predetermined number of crank angle degrees from the top dead center.

According to an example embodiment, the inlet valve may be maintained in the closed position for at least 20 crank angle degrees from the top dead center during the intake stroke. Hence, a minimum number of crank angle degrees can be set.

According to an example embodiment, the inlet valve may be maintained in the closed position for a maximum of 60 crank angle degrees from the top dead center during the intake stroke. Thus, a maximum number of crank angle degrees can be set.

The minimum and maximum number of crank angle degrees may be combined to form an interval.

According to an example embodiment, the method may further comprise the steps of positioning the inlet valve in the open position during the exhaust stroke before the reciprocating piston reaches the top dead center; and positioning the inlet valve in the closed position when the piston reaches the top dead center.

Positioning the inlet valve in the open position during a part of the exhaust stroke will further reduce the pressure level in the combustion chamber when the piston is positioned at the TDC. Hereby, it can be even further secured that lubricant will be provided to the connecting rod bearing.

According to an example embodiment, the inlet valve may be positioned in the open position within 15 crank angle degrees from the top dead center.

According to an example embodiment, the method may further comprise the step of positioning the outlet valve in the closed position when positioning the inlet valve in the open position during the exhaust stroke.

Hereby, the exhaust gases generated during the combustion stroke will, for a short period of time, be exhausted to the inlet. During the subsequent intake stroke, the exhaust gas will be directed into the combustion cylinder, thus providing intake gas at an increased temperature level.

It should be readily understood that some tolerances are within the scope of the specific definition "positioning the outlet valve in the closed position when positioning the inlet valve in the open position". Hence, the outlet valve may not necessarily be arranged in the closed position at the exact time of opening the inlet valve. The valves may hence both be arranged in the open, or at least partially open, position by an overlap.

According to an example embodiment, the method may be preceded by the steps of determining a difference between a gas pressure level of the fluid medium provided into the combustion cylinder and a pressure level of the combustion gas directed out from the combustion cylinder; and positioning the inlet valve in the open position during the exhaust stroke before the reciprocating piston reaches the top dead center if the pressure level of the combustion gas directed out from the combustion cylinder is higher than the pressure level of the fluid medium provided into the combustion cylinder.

An advantage is thus that the inlet valve need only be positioned in the open state during the exhaust stroke if the pressure level of the combustion gas directed out from the combustion cylinder is higher than the pressure level of the fluid medium provided into the combustion cylinder. If not, the inlet valve may be kept closed during the exhaust stroke.

The gas pressure levels upstream and downstream the combustion cylinder may be determined in various manners, such as by using pressure sensors, or to determine the gas pressure levels based on engine operation.

According to an example embodiment, lubrication of the connecting rod bearing may be performed at predetermined cycle intervals of the internal combustion engine arrangement, where each cycle starts with an intake stroke and ends with an exhaust stroke.

By performing the lubrication at predetermined intervals, the connecting rod bearing can be sufficiently lubricated while still substantially maintaining the efficiency of the internal combustion engine.

Lubrication may alternatively be performed for a predetermined number of different operation modes for the internal combustion engine arrangement. For example, lubrication may be performed if the speed of revolution (rpm) is below a predetermined threshold limit, or if the engine is exposed to high compression from a compression cylinder upstream the combustion cylinder, especially in combination with operating the vehicle at low rpm.

According to an example embodiment, lubrication of the connecting rod bearing may be performed between every $5^{th}$ and $20^{th}$ cycle. Other alternatives are of course conceivable and depending on e.g. the mode of operation of the internal combustion engine.

According to an example embodiment, the internal combustion engine arrangement may comprise a number of combustion cylinders, each combustion cylinder being provided with a connecting rod bearing, wherein lubrication of the connecting rod bearing is performed at a multiple integer interval of the number of combustion cylinders.

The wording "multiple integer" should be understood such that lubrication is performed at an interval which is based on the number of cylinders of the internal combustion engine arrangement. For example, an internal combustion engine arrangement comprising six cylinders may perform lubrication each $12^{th}$ cycle, i.e. a multiple integer of two.

According to an example embodiment, lubrication may be performed in a consecutive order between the connecting rod bearings of the combustion cylinders.

Hereby, lubrication is performed sequentially for the connecting rod bearing of the cylinders. Hence, the first connecting rod bearing is first lubricated, thereafter the second connecting rod bearing, etc.

According to a second aspect, there is provided an internal combustion engine arrangement comprising a combustion cylinder housing a reciprocating piston movable between a bottom dead center and a top dead center within the combustion cylinder; a connecting rod connecting the reciprocating piston to a crank shaft of the internal combustion engine; a connecting rod bearing arranged between the connecting rod and the reciprocating piston for allowing a mutual rotational movement between the connecting rod and the reciprocating piston when the reciprocating piston moves between the bottom dead center and the top dead center, said connecting rod bearing being arranged in fluid communication with a source of lubrication; and an inlet valve comprising a flow controllable actuator arranged to control the inlet valve to be operable between an open position and a closed position, wherein the inlet valve is arranged to be positioned in the open position during at least a part of an intake stroke of the reciprocating piston for allowing a flow of fluid medium into the combustion cylinder; the internal combustion engine arrangement further comprising a control unit connected to the flow controllable actuator and configured to control the flow controllable actuator to maintain the inlet valve in the closed position during a movement of the reciprocating piston from the top dead center during the intake stroke for a predetermined number of crank angle degrees; and control the flow controllable actuator to position the inlet valve in the open position when the reciprocating piston has traveled the predetermined number of crank angle degrees from the top dead center, wherein lubricating medium is arranged to be provided from the source of lubrication to the connecting rod bearing within a predetermined time period before the inlet valve is arranged in the open position.

According to an example embodiment, the control unit may be further configured to control the internal combustion engine arrangement to perform any one of the method steps described above in relation to the first aspect.

Effects and features of the second aspect are largely analogous to those described above in relation to the first aspect.

According to a third aspect, there is provided a vehicle comprising an internal combustion engine arrangement according to any one of the embodiments described above in relation to the second aspect.

According to a fourth aspect, there is provided a computer program comprising program code means for performing any one of the steps described above in relation to the first aspect when the program is run on a computer.

According to a fifth aspect, there is provided a computer readable medium carrying a computer program comprising program means for performing any one of the steps described above in relation to the first aspect when the program means is run on a computer.

Effects and features of the third, fourth and fifth aspects are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 3 is an example embodiment of an inlet valve for controlling the flow of fluid medium into the combustion cylinder;

FIGS. 4a-4b illustrate different valve positions during the intake stroke of the combustion cylinder according to an example embodiment;

DETAILED DESCRIPTION OF EXAMPLE EMBODIMENTS OF THE INVENTION

Figure 1:
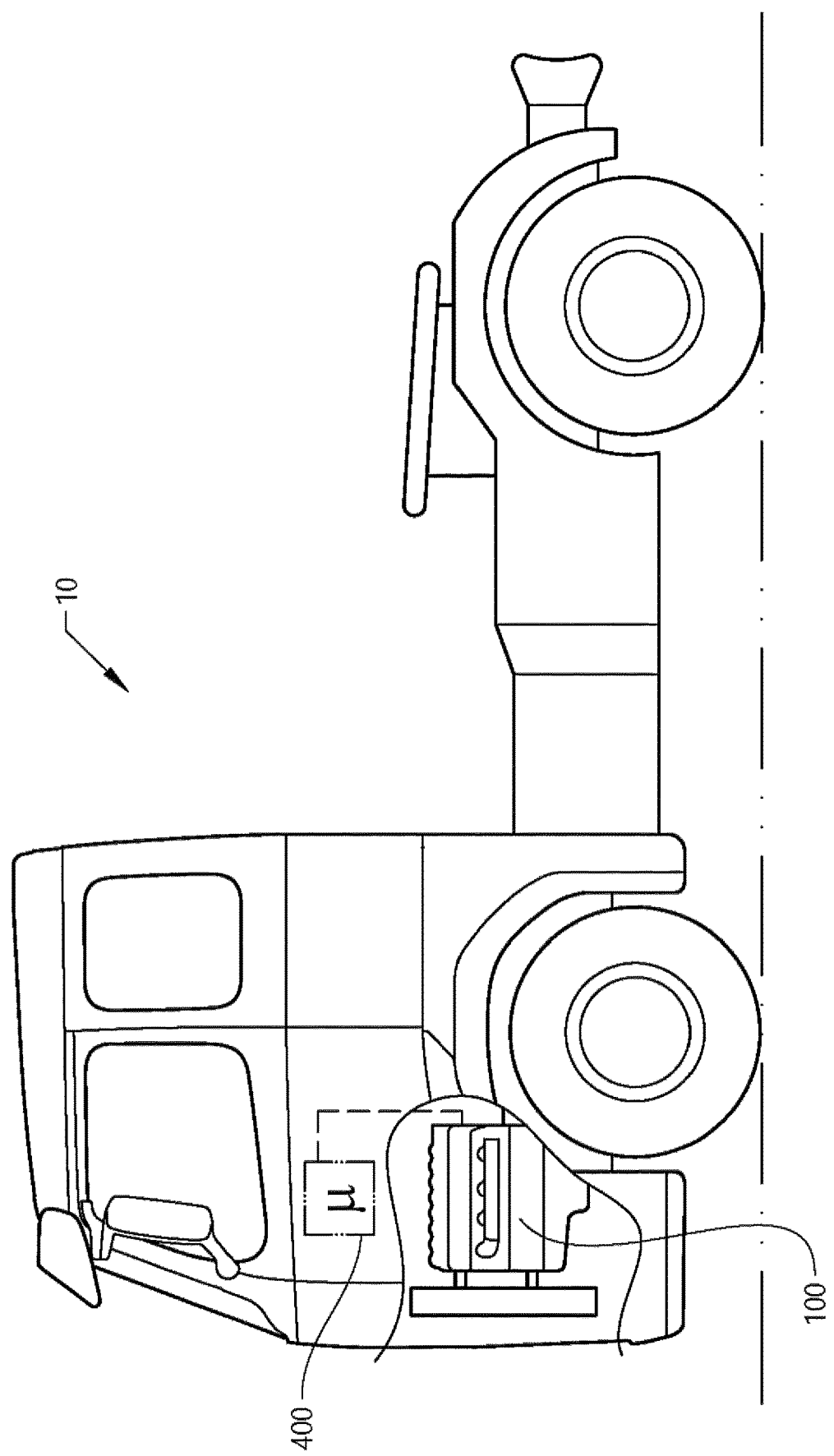
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a prime mover 100 in the form of an internal combustion engine arrangement 100. The internal combustion engine arrangement 100 may be propelled by e.g. a conventional fuel such as diesel, although other alternatives are conceivable. The internal combustion engine 100 is preferably operated in a four stroke fashion, i.e. operated by an intake stroke, a compression stroke, a combustion stroke, and an exhaust stroke. As further depicted in FIG. 1, the internal combustion engine arrangement 100 also comprises a control unit 400 for controlling operation of the internal combustion engine arrangement 100. The control unit 400 is thus preferably arranged to control inlet and outlet valves (depicted in FIGS. 3-5c) as will be described further below.

Figure 2:
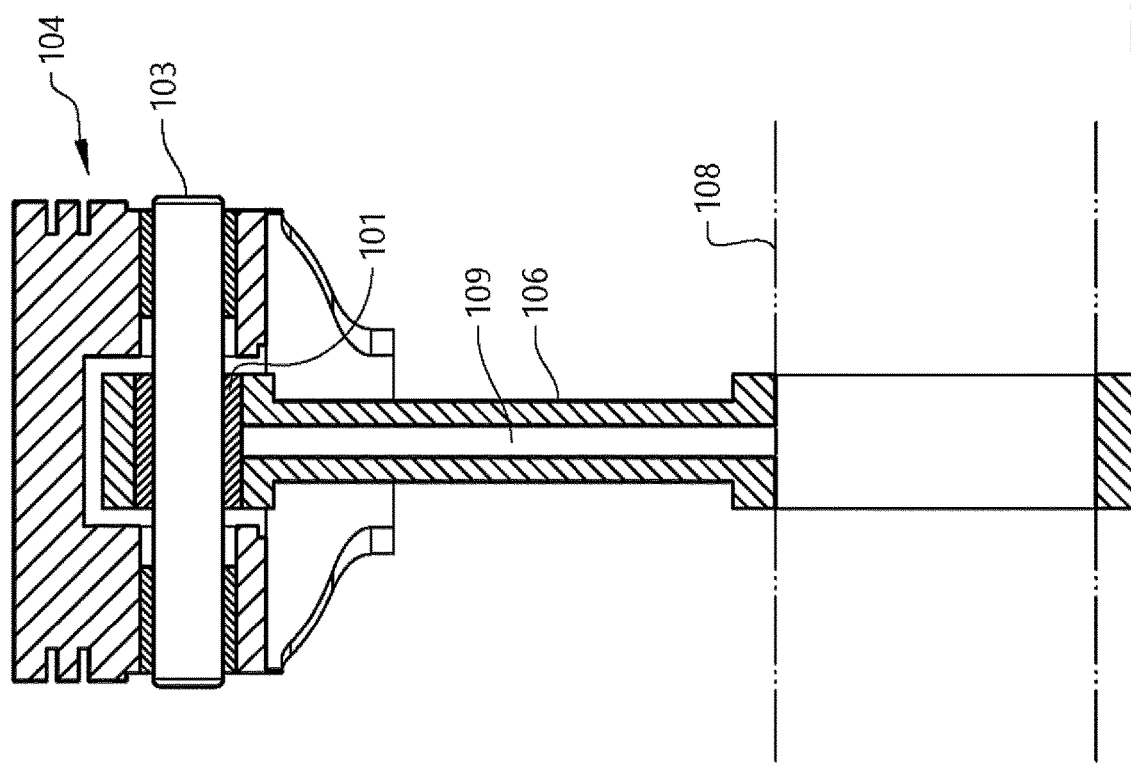
FIG. 2 is a cross-section of a piston connected to a connecting rod according to an example embodiment.

Reference is made to FIG. 2, which is a cross-section of a piston connected to a connecting rod according to an example embodiment. As illustrated in FIG. 2, the piston 104 of the combustion cylinder is connected to a crank shaft 108 for translating the vertical movement of the piston 104 to a rotational movement of the crank shaft 108. The piston 104 is connected to the crank shaft 108 via a connecting rod 106. Furthermore, a connecting rod 106 is arranged between the crank shaft 108 and the piston 104. In detail, the connecting rod 106 is connected to a piston pin 103 of the piston 104 via a connecting rod bearing 101.

Furthermore, the connecting rod 106 comprises a lubricant conduit 109. The lubricant conduit 109 is arranged inside the connecting rod 106 and configured to supply a lubricating medium to the connecting rod bearing 101. As will be described below, the connecting rod bearing 101 may be exposed to forces that prevents lubricating medium to be supplied to the connecting rod bearing 101. The description below with reference to FIGS. 4a-7 will present alternatives of improving the supply of lubricating medium to the connecting rod bearing 101.

Reference is now made to FIG. 3 which illustrates an example embodiment of an inlet valve for controlling the flow of fluid medium into the combustion cylinder. In detail, FIG. 3 illustrate the combustion cylinder 102, the reciprocating piston 104, the inlet valve 110 and outlet valve 112, wherein the inlet valve 110 comprises a flow controllable actuator 120, which flow controllable actuator is arranged to controllably operate the inlet valve between the open position and the closed position. The flow controllable actuator 120 is thus preferably connected to the control unit 400 depicted in FIG. 1 for controlling operation thereof. The description in relation to FIG. 3 will now solely focus on the flow controllable actuator 120 for presenting an example embodiment of how to control the operation of the inlet valve 110.

The inlet valve 110 thus comprises the flow controllable actuator 120 operatively connected to the valve member 92. The valve member is here a lift type valve member. By way of example, the lift type member can be a conventional poppet valve or the like, as shown in FIGS. 4a-5c. However, the valve member may likewise be provided as a rotational type valve member, a slide valve member, a seat valve member or the like. The actuator of the valve is configured to operate the valve member 92 by pneumatic pressure. As such, the valve member is a pressure activated valve member. In this example, the flow controllable actuator 120 comprises a pneumatic actuator operatively connected to a corresponding valve member. In particular, the actuator 120 of the inlet valve 110 is configured to operate the valve member via an actuator piston 95. The actuator 120 is in fluid communication with a pressurized air medium (not shown) via an air inlet 97 and an air outlet 98. In this manner, the pneumatic valve actuation utilizes compressed air to control the valve opening of the valve member, i.e. to operate the valve member between an open state and a closed state. Accordingly, the actuator comprises at least the air inlet 97 for the pressure fluid medium and at least the air outlet 98 for the pressure fluid medium. The pressurized air flowing in via the air inlet 97 is directed towards the actuator piston 95 by means of an air inlet valve 99. The air inlet valve 99 is disposed in the air inlet and configured to open and close the air inlet so as to control the flow of air to the actuator piston 95. Further, there is disposed an air outlet valve 96 in the air outlet 98, which is configured to open and close the air outlet in order to permit air to discharge from the actuator. Typically, as shown in FIG. 3, the actuator piston 95 is disposed in a chamber 84 defining a space for a reciprocating movement of the actuator piston 95. The actuator piston 95 is operable between a first position (an upper position), in which the valve member 92 is in the closed state, and a second position (a lower position), in which the valve member 92 is in the open state. The actuator piston 95 is operable between the first position (upper position) and the second position (lower position) by pressurizing and depressurizing the actuator. In addition, the flow controllable valve comprises a spring 87 arranged in-between the valve member 92 and the actuator piston 95 so as to return the valve member to its original position, i.e. corresponding to the upper position of the actuator piston disc 95.

The flow controllable valve may also have a hydraulic circuit comprising a hydraulic valve 84 and a chamber 82. Hydraulic fluid is provided to a chamber 83 in connection with the actuator piston 95. Hereby, when the piston moves to the second position, the hydraulic fluid in the chamber 83 dampen the motion of the actuator piston 95. The hydraulic fluid may also keep the valve stationary at a given position.

As described above, there are situations where the pressure exposed to the connecting rod bearing 101 is too high for properly supplying lubricant to the connecting rod bearing 101 via the lubricant conduit 109 arranged in the connecting rod 106. This problem may arise in situations where the internal combustion engine arrangement comprises one or more compression cylinders upstream the combustion cylinder. In such configuration, the air supplied to the combustion cylinder 102 is pre-compressed whereby the pressure level in the combustion cylinder will increase in comparison to a "conventional" internal combustion engine arrangement not using pre-compression.

A solution to this problem is to reduce the pressure in the combustion chamber at approximately 385-405 crank angle degrees (CAD) of the four stroke cycle operation. Hence, the pressure is preferably reduced at 15-45 CAD after the exhaust stage (which is the same as 15-45 CAD after initiation of the intake stroke), which is illustrated in further detail in FIG. 6 and further described below.

Reference is therefore now made to FIGS. 4a-4b, which illustrate different valve positions during the intake stroke of the combustion cylinder according to an example embodiment. As depicted, the reciprocating piston 104 is movable between a bottom dead center (BDC) position 105 and a top dead center (TDC) position 107. These positions are indicated by dashed lines in FIGS. 4a and 4b. The BDC 105 and the TDC 107 corresponds to the "turning positions" of the piston 104.

As can be seen in FIGS. 4a-4b, during the intake stroke, i.e. when the piston 104 moves from the TDC 107 towards the BDC 105, the inlet valve 110 is maintained in the closed position during a predetermined number of CAD 202 of the reciprocating piston 104 from the TDC 107. The predetermined number of CAD 202 may, according to a non-limiting example, be between 20-60 CAD. Hereby, flow of fluid medium 404, preferably air, is prevented from reaching the combustion chamber during the predetermined number of CAD 202 from the TDC. Thereafter, the inlet valve 110 is arranged in the open position for allowing the flow of fluid medium 404 to enter the combustion chamber during the following motion of the piston 104 to the BDC.

FIG. 4a illustrates the instantaneous point in time when the piston 104 has traveled the predetermined number of CAD 202 and the inlet valve 110 is closed, while FIG. 4b illustrates the instantaneous point in time when the piston 104 has traveled the predetermined number of CAD 202 and the inlet valve 110 is opened.

By maintaining the inlet valve 110 in the closed position during the predetermined number of CAD 202, the pressure in the combustion chamber will be reduced, and in turn the forces acting on the connecting rod bearing 101 will be reduced for allowing lubricating medium 402 to be provided to the connecting rod bearing 101. As illustrated in FIG. 4a, the lubricating medium 402 is provided to the connecting rod bearing 101 a time period before the inlet valve 110 is arranged in the open position, i.e. when the inlet valve 110 is maintained in the closed position.

Figure 5C:
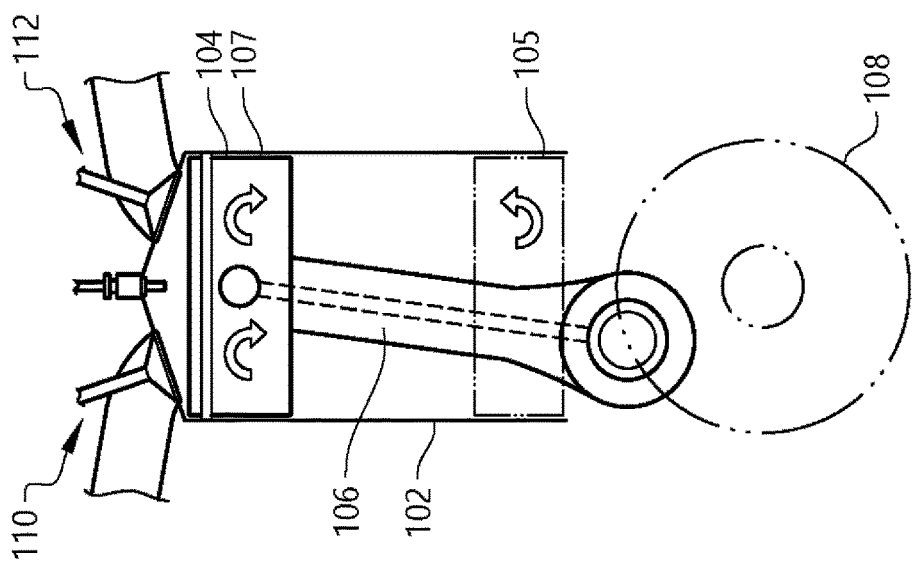
FIGS. 5a-5c illustrate different valve positions during the exhaust stroke of the combustion cylinder according to an example embodiment.
Figure 5B:
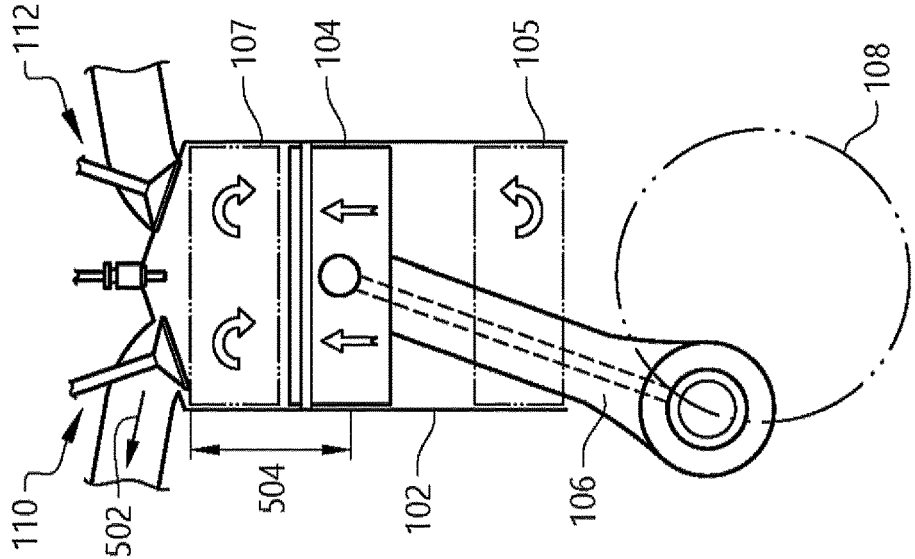
Figure 5A:
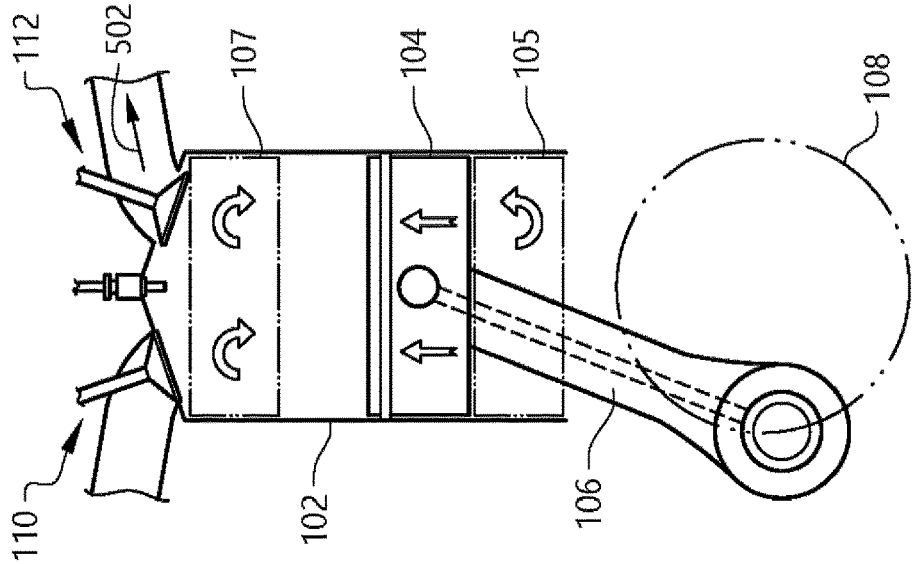

Reference is now made to FIGS. 5a-5c which illustrate different valve positions during the exhaust stroke of the combustion cylinder according to an example embodiment. Hence, the embodiment depicted in FIGS. 5a-5c may be performed to even further reduce the pressure in the combustion chamber.

Firstly, reference is made to FIG. 5a. As can be seen, the piston 104 is moving from the BDC 105 towards the TDC 107, and the outlet valve 112 is arranged in the open position for allowing combustion gases 502 to be exhausted from the combustion chamber. Accordingly, FIG. 5a illustrates an early point in time of the exhaust stage for the four stroke cycle operation.

With reference to FIG. 5b, before the piston 104 reaches the TDC 107 during the exhaust stroke, such as e.g. 10 CAD 504 before TDC, the inlet valve 110 is arranged in the open position and the outlet valve 112 is arranged in the closed position. Preferably, the inlet valve 110 is maintained in the open position until the piston 104 has reached the TDC 107 as illustrated in FIG. 5c, where both the inlet valve 110 and the outlet valve 112 are arranged in the closed position.

When the inlet valve 110 is arranged in the open position during the exhaust stroke as indicated in FIG. 5b, the combustion gases 502 are exhausted into the inlet and through the inlet valve 110. Hereby, the pressure in the combustion chamber is substantially rapidly reduced where after the intake stroke depicted in FIG. 4a is initiated, which reduces the pressure even further.

The embodiments described above with reference to FIGS. 4a-5c may preferably be performed during a cycle interval. Thus, the step of maintaining the inlet valve 110 in the closed position during the predetermined number of CAD 202, as well as the step of positioning the inlet valve 110 in the open position before the piston reached the TDC 107 during the exhaust stroke may thus be performed on a regular basis, such as e.g. between every $5^{th}$ and $20^{th}$ cycle. Also, the internal combustion engine arrangement may comprise a plurality of combustion cylinders, whereby the above described steps can be performed on a consecutive basis. Hence, the steps are performed sequentially, for one cylinder at the time.

Figure 6:
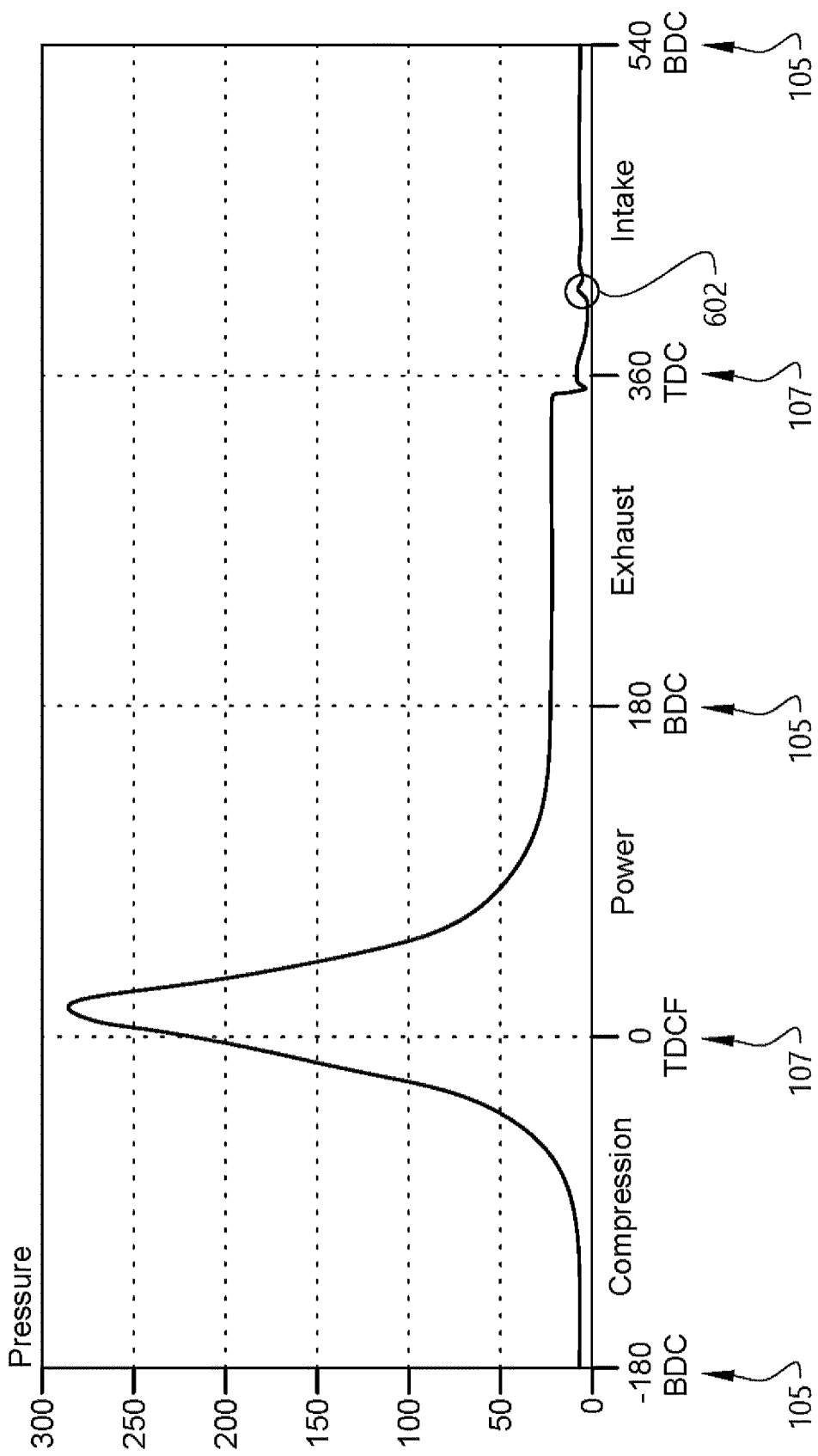
FIG. 6 is a graph illustrating the pressure levels in the combustion cylinder during the various strokes according to an example embodiment.

In order to illustrate the above described reduction of the pressure level in the combustion chamber, reference is now made to FIG. 6. FIG. 6 is a graph illustrating the pressure levels in the combustion cylinder during the various strokes according to an example embodiment. In FIG. 6, the horizontal axis represents the various stages during the four stroke cycle operation, while the vertical axis represents a non-limiting example of the pressure level within the combustion chamber. Accordingly, during the motion of the piston 104 from the BDC position 105 at −180 CAD to the TDC position 107 at 0 CAD, the combustion cylinder 102 operates in the compression stroke. Hereby, the inlet valve 110 and the outlet valve 112 are arranged in the closed position whereby the piston 104 compresses the air inside the combustion chamber. The pressure level at the end of the compression stage is, according to the non-limiting example of FIG. 6, approximately 225 bar.

Thereafter, the power stroke takes place, in which the piston moves from the TDC 107 at 0 CAD to the BDC 105 at 180 CAD, whereby the compressed air and gas in the combustion chamber is ignited, preferably self ignited. The pressure thus initially increases to approximately 270-280 bar, where after the pressure is reduced when the piston travels towards the BDC 105 at 180 CAD. The inlet valve 110 and the outlet valve 112 are kept closed during the power stroke.

Moreover, after the power stroke, the exhaust stroke is initiated when the piston 104 is positioned at the BDC 105 and is traveling towards the TDC 107. Hereby, the outlet valve 112 is arranged in the open position as depicted in FIG. 5a, whereby the combusted gases generated in the power stroke can be exhausted through the outlet of the combustion cylinder 102.

Finally, the intake stroke takes place after the exhaust stroke when the piston 104 travels from the TDC 107 at 360 towards the BDC 105 at 540 CAD. Hereby, the inlet valve 110 is open to allow air to be supplied into the combustion chamber of the combustion cylinder 102.

The above has thus described the conventional four stroke cycle operation. However, as can be seen in FIG. 6, the pressure level in the combustion chamber will be reduced when arranging the inlet valve 110 in the open position before the piston 104 reaches the TDC 107 during the exhaust stroke and when thereafter closing and maintaining the inlet valve 110 in the closed position a predetermined number of CAD 202 from the TDC 107 during the intake stroke. Accordingly, the pressure level initiates a reduction at approximately 350 CAD when the inlet valve is arranged in the open position. The pressure level is kept relatively low and is even further reduced at e.g. 390-400 CAD which is encircled with reference numeral 602. Hereby, the acceleration of the piston and thus the forces acting on the connecting rod bearing 101 are such that lubrication of the connecting rod bearing 101 is possible.

Figure 7:
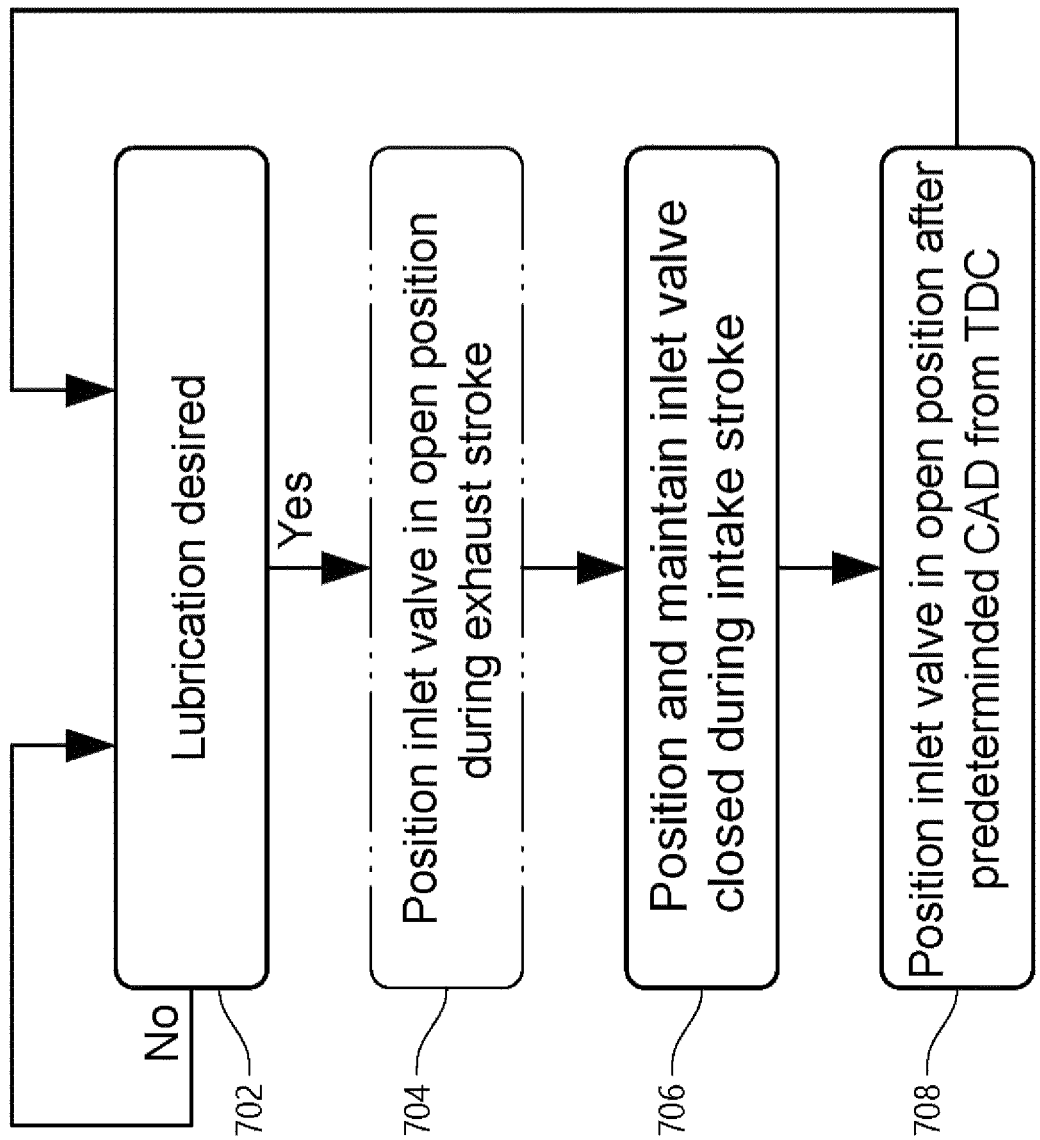
FIG. 7 is a flow chart of a method for controlling lubrication of a connecting rod bearing according to an example embodiment.

In order to summarize and illustrate the above described lubrication method in further detail; reference is made to FIG. 7 which is a flow chart of a method for controlling lubrication of a connecting rod bearing according to an example embodiment.

Firstly, it is determined if lubrication is desired 702. This can be determined by the above described lubrication cycle, i.e. it is determined that lubrication is desired if lubrication was previously performed a predetermined number of cycles ago. Hence, step 702 does not need to be an actively performed step, but rather a pre-programmed step set to be performed at a predetermined cycle interval.

Thereafter, the inlet valve 110 is arranged in the open position for a relatively short period of time before the piston 104 reaches the TDC 107 during the exhaust stroke. When the inlet valve 110 is opened, the outlet valve 112 is preferably closed.

Hereby, the pressure level in the combustion chamber will be reduced, as clearly depicted at approximately 350 CAD in FIG. 6. When the piston 104 thereafter arrives at the TDC 107, also the inlet valve 110 is arranged in the closed position.

In the following intake stroke, the inlet valve 110 is maintained 706 in the closed position during a predetermined number of crank angles. Hereby, the pressure level within the combustion chamber will be even further reduced as indicated at approximately 360-410 CAD in FIG. 6. A time period before the piston has travelled the predetermined number of CAD 202, the lubricating medium is supplied to the connecting rod bearing 101.

Finally, when the piston 104 has traveled the predetermined number of CAD 202 during the intake stroke, the inlet valve is positioned 708 in the open position for allowing air to be supplied to the combustion chamber.

Although the above has described that use of step 704, i.e. to arrange the inlet valve 110 in the open position during the exhaust stroke, this step may be optional depending on the specific application and engine configuration. Hence, it may be sufficient to reduce the pressure level by maintaining the inlet valve in the closed position for a predetermined number of CAD 202 during the intake stroke.

It is to be understood that the present invention is not limited to the embodiments described above and illustrated in the drawings; rather, the skilled person will recognize that many changes and modifications may be made within the scope of the appended claims. It should also be readily understood that the above described steps can be executed simultaneously and the above described order is merely for simplicity of understanding.

The invention claimed is:

1. A method for controlling lubrication of a connecting rod bearing of an internal combustion engine arrangement, the internal combustion engine arrangement comprising:
   a combustion cylinder, wherein the combustion cylinder is housing a reciprocating piston movable between a bottom dead center and a top dead center within the combustion cylinder;
   a connecting rod connecting the reciprocating piston to a crank shaft of an internal combustion engine of the internal combustion engine arrangement, wherein the connecting rod bearing is arranged between the connecting rod and the reciprocating piston for allowing a mutual rotational movement between the connecting rod and the reciprocating piston when the reciprocating piston moves between the bottom dead center and the top dead center; and;
   an inlet valve operable between an open position and a closed position, the inlet valve being arranged in the open position during at least a part of an intake stroke of the reciprocating piston for allowing a flow of fluid medium into the combustion cylinder; and an outlet valve operable between an open position and a closed position, the outlet valve being arranged in the open position during at least a part of an exhaust stroke of the reciprocating piston for directing a flow of combustion gas out from the combustion cylinder, wherein the method comprises the steps of:
   controlling the inlet valve to be maintained in the closed position during a movement of the reciprocating piston from the top dead center during the intake stroke for a predetermined number of crank angle degrees;
   positioning the inlet valve in the open position when the reciprocating piston has traveled the predetermined number of crank angle degrees from the top dead center, wherein lubricating medium is provided to the connecting rod bearing, via a lubricant conduit arranged in the connecting rod, within a predetermined time period before the inlet valve is arranged in the open position,
   positioning the inlet valve in the open position during the exhaust stroke before the reciprocating piston reaches the top dead center;
   positioning the inlet valve in the closed position when the reciprocating piston reaches the top dead center, and
   positioning the outlet valve in the closed position when positioning the inlet valve in the open position during the exhaust stroke.

2. The method according to claim 1, wherein the inlet valve comprises an actuator arranged to be fed by a flow of pressurized fluid when operating the inlet valve from the closed position to the open position.

3. The method according to claim 2, wherein the step of opening the inlet valve comprises the step of:
   providing pressurized fluid to the actuator when the reciprocating piston has traveled the predetermined number of crank angle degrees from the top dead center.

4. The method according to claim 1, wherein the inlet valve is maintained in the closed position for at least 20 crank angle degrees from the top dead center during the intake stroke.

5. The method according to claim 1, wherein the inlet valve is maintained in the closed position for a maximum of 60 crank angle degrees from the top dead center during the intake stroke.

6. The method according to claim 1, wherein the inlet valve is positioned in the open position within 15 crank angle degrees from the top dead center.

7. The method according to claim 1, preceded by the steps of:
   determining a difference between a gas pressure level of the fluid medium provided into the combustion cylinder and a pressure level of the combustion gas directed out from the combustion cylinder; and positioning the inlet valve in the open position during the exhaust stroke before the reciprocating piston reaches the top dead center when the pressure level of the combustion gas directed out from the combustion cylinder is higher than the pressure level of the fluid medium provided into the combustion cylinder.

8. The method according to claim 1, wherein lubrication of the connecting rod bearing is performed at predetermined cycle intervals of the internal combustion engine arrangement, where each cycle starts with the intake stroke and ends with the exhaust stroke.

9. The method according to claim 8, wherein lubrication of the connecting rod bearing is performed between every $5^{th}$ and $20^{th}$ cycle.

10. The method according to claim 1, wherein the internal combustion engine arrangement comprises a number of combustion cylinders, each combustion cylinder of the number of combustion cylinder being provided with the connecting rod bearing, wherein lubrication of the connecting rod bearing is performed at a multiple integer interval of the number of combustion cylinders.

11. The method according to claim 10, wherein lubrication is performed in a consecutive order between the connecting rod bearings of the combustion cylinders.

12. A computer readable medium carrying a computer program comprising program code for performing the steps of claim 1 when the program code is run on a computer.

13. An internal combustion engine arrangement comprising:
a combustion cylinder housing a reciprocating piston movable between a bottom dead center and a top dead center within the combustion cylinder;
a connecting rod connecting the reciprocating piston to a crank shaft of an internal combustion engine of the internal combustion engine arrangement;
a connecting rod bearing arranged between the connecting rod and the reciprocating piston for allowing a mutual rotational movement between the connecting rod and the reciprocating piston when the reciprocating piston moves between the bottom dead center and the top dead center, the connecting rod bearing being arranged in fluid communication with a source of lubrication; and
an inlet valve comprising an actuator operated by a flow of pressurized fluid, the actuator being arranged to control the inlet valve to be operable between an open position and a closed position, wherein the inlet valve is arranged to be positioned in the open position during at least a part of an intake stroke of the reciprocating piston for allowing a flow of fluid medium into the combustion cylinder; the internal combustion engine arrangement further comprising a control unit connected to the actuator and configured to:
control the actuator to maintain the inlet valve in the closed position during a movement of the reciprocating piston from the top dead center during the intake stroke for a predetermined number of crank angle degrees;
control the actuator to position the inlet valve in the open position when the reciprocating piston has traveled the predetermined number of crank angle degrees from the top dead center, wherein lubricating medium is arranged to be provided from the source of lubrication to the connecting rod bearing, via a lubricant conduit arranged in the connecting rod, within a predetermined time period before the inlet valve is arranged in the open position; and
control the actuator to position the inlet valve in the open position during an exhaust stroke before the reciprocating piston reaches the top dead center;
control the actuator to position the inlet valve in the closed position when the reciprocating piston reaches the top dead center, and
control an outlet valve in the closed position when positioning the inlet valve in the open position during the exhaust stroke.

14. A vehicle comprising the internal combustion engine arrangement according to claim 13.

* * * * *